United States Patent
Thompson et al.

(10) Patent No.: US 9,497,213 B2
(45) Date of Patent: Nov. 15, 2016

(54) SYSTEM AND METHOD TO MANAGE SINKHOLES

(71) Applicant: FireEye, Inc., Milpitas, CA (US)

(72) Inventors: Matthew Thompson, Alexandria, VA (US); Karim Hijazi, Alexandria, VA (US)

(73) Assignee: FireEye, Inc., Milpitas, CA (US)

( * ) Notice: Subject to any disclaimer, the term of this patent is extended or adjusted under 35 U.S.C. 154(b) by 51 days.

(21) Appl. No.: 13/936,706

(22) Filed: Jul. 8, 2013

(65) Prior Publication Data

US 2014/0283063 A1    Sep. 18, 2014

Related U.S. Application Data

(60) Provisional application No. 61/794,229, filed on Mar. 15, 2013.

(51) Int. Cl.
*H04L 29/06* (2006.01)
*H04L 29/12* (2006.01)

(52) U.S. Cl.
CPC ......... *H04L 63/145* (2013.01); *H04L 61/1511* (2013.01)

(58) Field of Classification Search
CPC .................................................. H04L 63/145
USPC .......................................................... 726/23
See application file for complete search history.

(56) References Cited

U.S. PATENT DOCUMENTS

| | | | |
|---|---|---|---|
| 7,366,131 B2 * | 4/2008 | Park | H04B 1/1615 370/328 |
| 7,937,387 B2 | 5/2011 | Frazier et al. | |
| 8,006,305 B2 | 8/2011 | Aziz | |
| 8,069,484 B2 | 11/2011 | McMillan et al. | |
| 8,171,553 B2 | 5/2012 | Aziz et al. | |
| 8,204,984 B1 | 6/2012 | Aziz et al. | |
| 8,291,499 B2 | 10/2012 | Aziz et al. | |
| 8,375,444 B2 | 2/2013 | Aziz et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,239 B2 | 11/2013 | Aziz et al. | |
| 8,635,696 B1 | 1/2014 | Aziz | |
| 8,689,333 B2 | 4/2014 | Aziz | |
| 8,713,681 B2 | 4/2014 | Silberman et al. | |
| 8,776,229 B1 | 7/2014 | Aziz | |
| 8,793,278 B2 | 7/2014 | Frazier et al. | |
| 8,793,787 B2 | 7/2014 | Ismael et al. | |
| 8,832,829 B2 | 9/2014 | Manni et al. | |
| 8,850,571 B2 | 9/2014 | Staniford et al. | |
| 8,881,271 B2 | 11/2014 | Butler, II | |

(Continued)

OTHER PUBLICATIONS

Antonakakis, "Detecting Malware Domains at the Upper DNS Hierarchy", Georgia Institute of Technology, 2011, pp. 1-16.*

(Continued)

*Primary Examiner* — Hadi Armouche
*Assistant Examiner* — Ali Shayanfar
(74) *Attorney, Agent, or Firm* — Rutan & Tucker, LLP

(57) ABSTRACT

A system and method operable to manage and/or distribute sinkholes.

27 Claims, 2 Drawing Sheets

(56) References Cited

U.S. PATENT DOCUMENTS

| | | |
|---|---|---|
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 2003/0067923 A1* | 4/2003 | Ju ............... H04L 29/12066 370/395.3 |
| 2005/0128990 A1* | 6/2005 | Eom ............... H04W 52/0225 370/338 |
| 2007/0206088 A1* | 9/2007 | Mizunashi ............... H04N 7/16 348/14.01 |
| 2007/0250930 A1 | 10/2007 | Aziz et al. |
| 2008/0005782 A1 | 1/2008 | Aziz |
| 2008/0034211 A1* | 2/2008 | Shull et al. ................ 713/175 |
| 2008/0155694 A1* | 6/2008 | Kwon et al. ................ 726/23 |
| 2008/0184367 A1 | 7/2008 | McMillan et al. |
| 2008/0229021 A1* | 9/2008 | Plamondon ......... H04L 67/2847 711/125 |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2010/0030996 A1 | 2/2010 | Butler, II |
| 2010/0036725 A1* | 2/2010 | Turakhia ................ 705/14.39 |
| 2010/0115621 A1 | 5/2010 | Staniford et al. |
| 2010/0192223 A1 | 7/2010 | Ismael et al. |
| 2011/0060950 A1* | 3/2011 | Waldron et al. ................ 714/48 |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0173213 A1 | 7/2011 | Frazier et al. |
| 2011/0247072 A1 | 10/2011 | Staniford et al. |
| 2011/0270969 A1* | 11/2011 | Noh et al. .................... 709/224 |
| 2011/0314546 A1 | 12/2011 | Aziz et al. |
| 2012/0117652 A1 | 5/2012 | Manni et al. |
| 2012/0131156 A1* | 5/2012 | Brandt et al. ................ 709/221 |
| 2012/0174186 A1 | 7/2012 | Aziz et al. |
| 2012/0198549 A1* | 8/2012 | Antonakakis et al. .......... 726/22 |
| 2012/0222121 A1 | 8/2012 | Staniford et al. |
| 2012/0278626 A1* | 11/2012 | Smith et al. ................ 713/176 |
| 2012/0331553 A1 | 12/2012 | Aziz et al. |
| 2013/0036472 A1 | 2/2013 | Aziz |
| 2013/0047257 A1 | 2/2013 | Aziz |
| 2013/0227691 A1 | 8/2013 | Aziz et al. |
| 2013/0247186 A1 | 9/2013 | LeMasters |
| 2013/0268604 A1* | 10/2013 | Gupta ............... H04L 27/2657 709/206 |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0326084 A1* | 12/2013 | Huang et al. ................ 709/238 |
| 2014/0032875 A1 | 1/2014 | Butler |
| 2014/0064099 A1* | 3/2014 | Kuroda ............... H04L 61/1511 370/236 |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |
| 2016/0191547 A1 | 6/2016 | Zafar et al. |

OTHER PUBLICATIONS

Bruneau, "DNS Sinkhole", 2010 The SANS Institute, pp. 1-42.*

\* cited by examiner

SYSTEM AND METHOD TO MANAGE SINKHOLES

CROSS-REFERENCE TO RELATED APPLICATION

This patent application claims priority to U.S. Provisional Patent Application Ser. No. 61/794,229 filed Mar. 15, 2013, and titled System and Method to Manage Sinkholes, the entire contents of which is incorporated herein by reference in its entirety.

BACKGROUND

1. Field

The present inventive concept pertains to a system and method to managing sinkholes. The present inventive concept more particularly concerns a system and method to manage sinkholes via various distribution techniques.

2. Discussion of Related Art

Malware authors or attackers of computer systems often use malware that is installed on victims systems. The malware relies on communication to a command and control (C2) server controlled by the attached. In some instances, the attacker loses control of the C2 server and must rely on the public domain name system (DNS) to direct the malware towards a different C2 server IP address.

Sinkholing is the process of gaining control of one or more of the C2 DNS names by a friendly party, and configuring the DNS name to resolve to a friendly sinkhole IP address. The change in DNS name resolution to the friendly IP address causes the malware to initiate connections to a sinkhole sensor which has full global visibility of networks which have been compromised. In this manner, a DNS sinkhole can be used to provide detection and prevention of malicious and unwanted activity occurring between an organization's computer and the Internet. Further information regarding such may be obtained via a paper titled DNS Sinkhole by G. Bruneau dated Aug. 7, 2010, which is incorporated by reference in its entirety.

The major challenge in creating a sinkhole is attribution of the sinkhole presence on the Internet to the malware network operators. If the attacker is able to identify a presence of a particular sinkhole space, they are able to trivially block access to the sinkhole network in new malware or through subsequent updates to an existing malware install base, which prevents deflection of the attacker's C2 communications to a sinkhole network. Current malware sinkholes often operate on a single IP or contiguous range of IP addresses. For example, this has been observed when running a sinkhole in a Class C network (/24). Attackers were found to be blacklisting C2 communications to the entire range. By inserting these blacklists, the attackers effectively cut off the ability to successfully sinkhole the malware, that is, no traffic would be received on the sensors after deflection, which presents a challenge.

Another challenge is mitigating the effects of distributed denial of service attacks. When malware is deflected from the attacker to a sinkhole, they have been known to launch attacks against the sinkhole itself. The attacker often has access to other networks of compromised systems that they use to launch distributed denial of service attacks.

For example, a large DDoS attack was launched against a sinkhole environment with a single connection to the Internet. The provider was forced to null route the entire Class C network upstream. The attack volume was large enough to bring the provider network offline until the null route was in place.

SUMMARY

The present inventive concept described herein remedies the aforementioned problems by providing a unique system and method operable to manage and/or distribute sinkholes via one or more various sinkhole-distribution techniques.

The aforementioned may be achieved in an aspect of the present inventive concept by providing a method to distribute one or more sinkholes by transmitting a takedown request to a cooperative registrar of a target domain upon occurrence of a predetermined event. The takedown request may cause the registrar to perform a zone update to a zone of the target domain. The zone update may be effective to (i) prevent reception by a first server of one or more records from a second server, and/or (ii) cause one or more other records to be returned, the one or more other records configured to instruct the first server to contact one or more name servers associated with one or more sinkholes.

The registrar may (i) be previously known to be a cooperative registrar, and/or (ii) have authority to make one or more TLD zone file changes for the target domain. The zone of the target domain may be a top level domain zone. The first server may be a recursive server. The second server may be an original authoritative server for the domain. The records may be glue records from a TLD name server associated with the second server.

The one or more sinkholes may be one or more sinkhole islands. The first server may be configured to query a name server of one or more of the one or more sinkhole islands for the domain. The first server may be configured to consult a database for a record or an IP address for a sinkhole sensor node within the one or more sinkhole islands. The record or the IP address for the sinkhole sensor node may be returned to a malware or other receiver via a stub resolver or other transmitter. The event may be one or more of (i) an occurrence of a public event, (ii) identification of a new malware author or group, (iii) identification of a new malware family, (iv) a component reaching a threshold, and/or (v) elapse of a predetermined period of time.

The aforementioned may be achieved in another aspect of the present inventive concept by providing a system configured to distribute one or more sinkholes. The system may include a transmitter configured to transmit a takedown request to a cooperative registrar of a domain upon occurrence of an event. The takedown request may cause the registrar to perform a zone update to a zone of the target domain. The zone update may be effective to (i) prevent reception by a first server of one or more records from a second server, and/or (ii) cause one or more other records to be returned, the one or more other records configured to instruct the first server to contact one or more name servers associated with one or more sinkholes.

The registrar may be previously known to at least one of (i) be a cooperative registrar, and (ii) have authority to make one or more TLD zone file changes for the target domain. The zone of the target domain may be a top level domain zone. The first server may be a recursive server. The second server may be an original authoritative server for the domain. The records may be glue records from a TLD name server associated with the second server.

The one or more sinkholes may be one or more sinkhole islands each including at least one authoritative name server and at least one sinkhole sensor node that collectively operate to substitute a target domain with the IP address operating as a substitute domain for the target domain. The first server may be configured to query a name server of one or more of the one or more sinkhole islands for the domain. The first server may be configured to consult a database for a record or an IP address for a sinkhole sensor node within the one or more sinkhole islands. The record or the IP address for the sinkhole sensor node may be returned to a malware or other receiver via a stub resolver or other transmitter. The event may be one or more of (i) an occurrence of a public event, (ii) identification of a new malware author or group, (iii) identification of a new malware family, (iv) a component reaching a threshold, and/or (v) elapse of a predetermined period of time.

Additional aspects, advantages, and utilities of the present inventive concept will be set forth in part in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

The present inventive concept is described in detail below with reference to the attached drawing figures, wherein.

Figure 1:
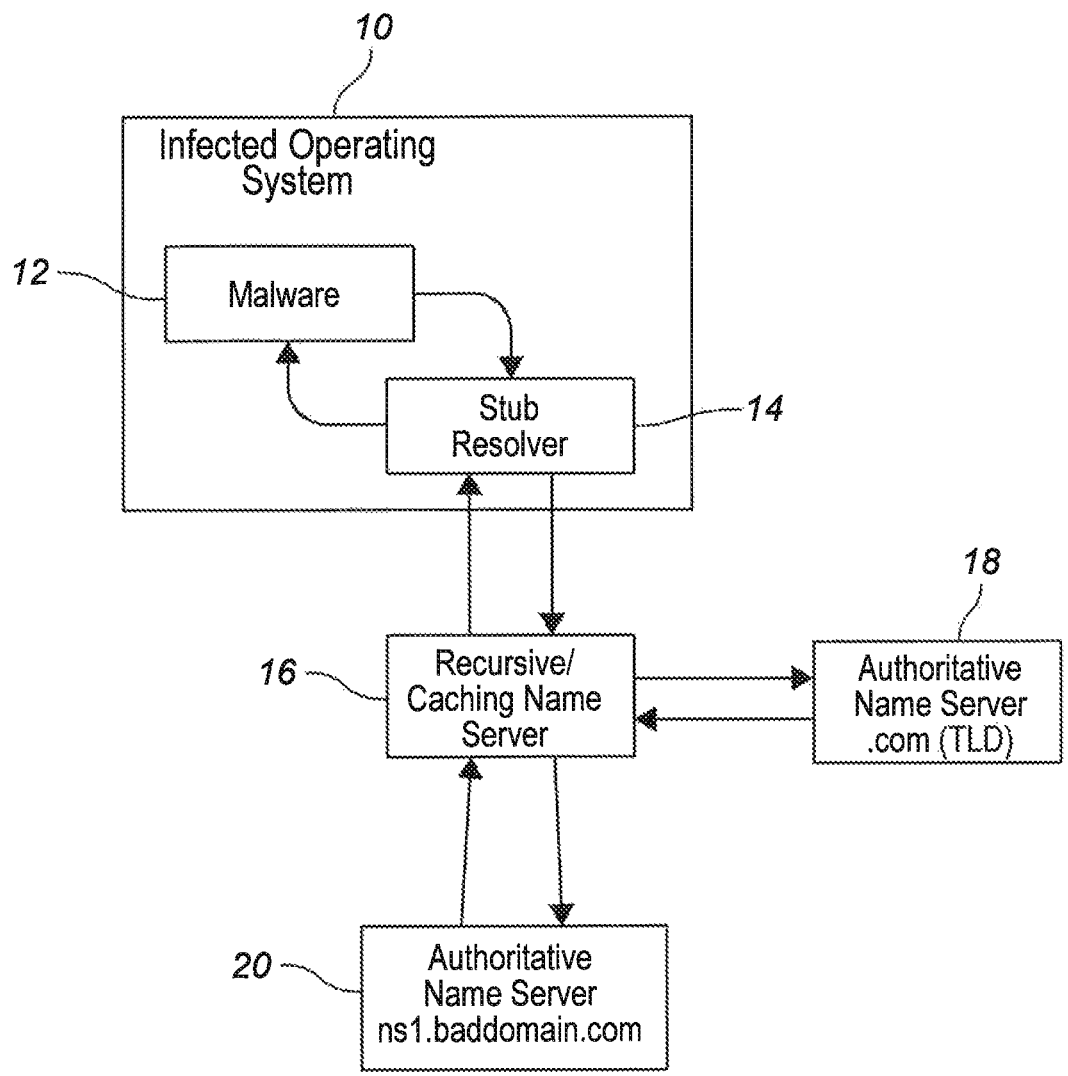
FIG. 1 is a diagram illustrating a process during which malware obtains command and control of an IP address using a public DNS service.

The drawing figures do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

When using DNS to deflect malware C2 in a sinkhole network, the ability to map the network using passive DNS techniques may be challenging. The system of the present inventive concept utilizes passive DNS to recreate a DNS zone database by observing or monitoring DNS network communications. Further, pivotal data points of a known sinkhole can be identified and utilized by the system of the present inventive concept to identify other components of a network of the known sinkhole.

Known sinkholes use a single authoritative DNS nameserver name. The system of the present inventive concept is configured to generate a query against a passive DNS database for zones with the sinkhole nameserver name to discover other names associated with the sinkhole. Once the other names associated with the sinkhole nameserver name are identified by the system of the present inventive concept, IP addresses associated with each of the names are identified by the system of the present inventive concept. The IP addresses associated with each of the names are then used by the system of the present inventive concept to identify all of the IP addresses associated with sinkhole activity.

The system of the present inventive concept is configured to physically distribute components of the sinkhole, which provides a number of advantages. By setting sensor nodes of the sinkhole to one or more IP addresses belonging to a hosting provider, attribution of the sinkhole environment to an organization or an individual responsible for deflecting the malware to the sinkhole may be achieved.

Malware authors are unable to implement blacklists because the sensor nodes are in disparate IP space(s). This process is effective to exploit malware techniques because malware authors typically require their C2 to be moved to different servers if they lose control of an IP address.

The physical distribution performed by the system of the present inventive concept also mitigates denial of service attacks. More specifically, attacks on a single sinkhole sensor node are prevented from impacting other sensors due to the physical distribution performed by the system of the present inventive concept. This substantially reduces the likelihood of a successful launch of an effective denial of service attack, i.e, a successful execution of the malware, against multiple targets because aggregate bandwidth between them is higher and each network will receive lower packet per second and throughput rates.

The system of the present inventive concept is effective to hide a centralized collector network from public view. A centralized collector network is hidden by way of an encrypted virtual private network between the sensor nodes and the collector as well as not being publicly accessible, e.g., accessible via the Internet. In this manner, the collector is not overtly associated with the sensor network. Additionally, such allows the collector network to remain static without risk of blacklisting or direct attack by the attacker.

Total available aggregate bandwidth is also an important factor in distributing the sensors by the system of the present inventive concept. Malware beacons are often very small with a high packet per second rate from various, e.g., millions of, source IP addresses. By distributing the sensor nodes, the system of the present inventive concept is configured to handle the volume of malware traffic, which also allows the system to grow easily as new bandwidth is required. In other words, by allowing additional islands, or sensor nodes, to be brought online via the system of the present inventive concept, the system of the present inventive concept provides a large number of sinkholes, e.g., at least three sinkholes, and preferably greater than ten sinkholes, so that no single sinkhole or set of sinkholes needs to handle all of the redirected traffic. The present inventive concept bases number of sinkholes on type of malware that is being redirected. In scenarios, e.g., applications related to highly verbose malware, the present inventive concept utilizes a larger grouping of sinkholes to meet specific or predetermined thresholds and/or DNS server loads.

The system of the present inventive concept utilizes a collection of small islands, which at least partially comprise the system. The islands include one or more of an authoritative name server(s), a DNS name(s), and/or a dedicated sensor(s). By maintaining the system of the present inventive concept in this manner, the likelihood of identifying or discovering any of the components within the overall sinkhole system of the present inventive concept by a malware is significantly reduced. Further, the islands of the system of the present inventive concept are effective to prevent passive DNS from capturing pivotal data points of the system.

Further, the islands of the system of the present inventive concept are also effective to denying service mitigation. Because an attacker or malware author is likely to only have knowledge of a single island, the malware author is advantageously prevented from targeting other islands. In this manner, such other islands within the system of the present inventive concept remain unaffected by the malware.

The system of the present inventive concept utilizes one or more of the following factors to determine when to create one or more new islands. The factors include occurrence of a public event, identification of a new malware author or group, identification of a new malware family, reaching a predetermined threshold.

Regarding the public event, domain names are known to be associated with a public event that may be identified and/or reported on via media, a miscellaneous report, and/or the like. In such a scenario, there are typically a large number of people investigating these domains. By isolating the domains using an island, the system of the present inventive concept is effective to prevent discovery of one or more other sinkhole domain names.

Regarding identification of a new malware author or group, a new threat actor group or attacker may be identified as being responsible for one or more domains slated for sinkholing. If domains associated with an actor are split between two islands, both of the islands may be discovered. Thus, the system of the present inventive concept is configured to isolate domains that are known to be associated with an actor, thereby preventing them from discovering other components of the system.

Regarding identification of a new malware family, if a new malware family is detected and has no known relationship with an existing group, the system of the present inventive concept isolates the one or more new malware families to prevent malware authors or actors from determining other components of the system.

Regarding reaching a threshold, if throughput to the authoritative DNS server reaches a threshold, the system of the present inventive concept creates a new island, which is effective to spread the DNS server load.

Regarding elapse of a period of time, if a period of time has elapsed, one or more new islands may be created so that the sinkhole system is a moving target. In most cases, sinkhole operators are unaware as to whether any components of the system have been discovered by the malware author or actor. Thus, it is desirable to move such components to mitigate the risk of actors putting hard-coded blocks into the malware to prevent communication with the sinkhole by the operator.

The system of the present inventive concept utilizes a number of processes including deflection, classification, and/or collection processes. By using the deflection process, the system of the present inventive concept is effective to redirect traffic flows to one or more classification sensors using one or more of (i) global DNS (Registrar, gTLD, ccTLD), (ii) upstream DNS, i.e., rewriting a record responses on the fly, (iii) redirecting direct IP, and/or (iv) other like processes.

In the classification process, the system of the present inventive concept utilizes one or more ephemeral, geographically distributed sensors in one or more disparate IP spaces. Each of the one or more sensors is configured to run identical software and indicators, which provides a means to classify packets and/or flows containing known malicious activity. High signal noise due to deflection process may result in very little 'normal' traffic arriving at a classification sensor. The one or more sensors are connected to one or more collection networks through a tunnel carrying encapsulated IP packets in a private broadcast domain. The one or more sensors mutually authenticate with the one or more collection networks. Each time a packet or flow is classified, an event message is generated and broadcast across the tunnel to one or more collectors.

The collection process involves a concentration of tunnels from remote distributed classification sensors. Each of the tunnels is decapsulated into one or more aggregate groups, and each include a single interface, bridge, VLAN trunk, and/or the like. Groups of aggregate messages may contain different messages types including, but not limited to, payload signature match, DNS indicator match, statistics, and/or the like. Messages arriving on an aggregate group may be received and processed by one or more log collectors. The log collectors are effective to bind to the broadcast address and port to receive messages for the desired group. The log collectors may reside on a single system or a network of systems connected to a switch or hub.

Turning to FIG. 1, a process during which malware obtains command and control of an IP address using a public DNS service is illustrated, which includes an operating system 10 having malicious software or malware 12 and a stub resolver 14. It is foreseen that the system of the present inventive concept may be used with the operating system 10 even if it does not contain the malware 12. The infected operating system 10 containing the malware 12 is configured to communicate and request the IP address for its command and control of a domain, e.g., "baddomain.com." The system is configured to use one or more operating system primitives to communicate with and request that the stub resolver 14 obtain the IP address of the domain, e.g., "baddomain.com:" The operating system 10 and the stub resolver 14 are configured for two-way communication therebetween. The stub resolver 14 is configured to communicate with a recursive/cashing name server 16 for the domain, e.g., "baddomain.com." The stub resolver 14 and the recursive/cashing name server 16 are configured for two-way communication therebetween. The recursive server 16 is configured to begin a DNS recursion process and communicate with an authoritative name server 18 to ask for a .com zone. The .com TLD server 18 is configured to return "glue" records to instruct the recursive server 16 regarding where to find the authoritative answer for the domain, e.g., "baddomain.com." Finally, the recursive server 16 is configured to ask an authoritative server 20 for the IP address of the domain, e.g., "baddomain.com." The server 16 is configured for two-way communication between the servers 18, 20 in addition to the infected operating system 10 via the stub resolver 14.

Once the recursive server 16 receives an answer via communication from the server 18 and/or server 20, the recursive server 16 communicates a response to the stub resolver 14 containing an "A" record, i.e., IP Address, for the domain, e.g., "baddomain.com." Subsequently, the stub resolver 14 is configured to return the IP address through primitives of the operating system 10 to the malware 12.

Figure 2:
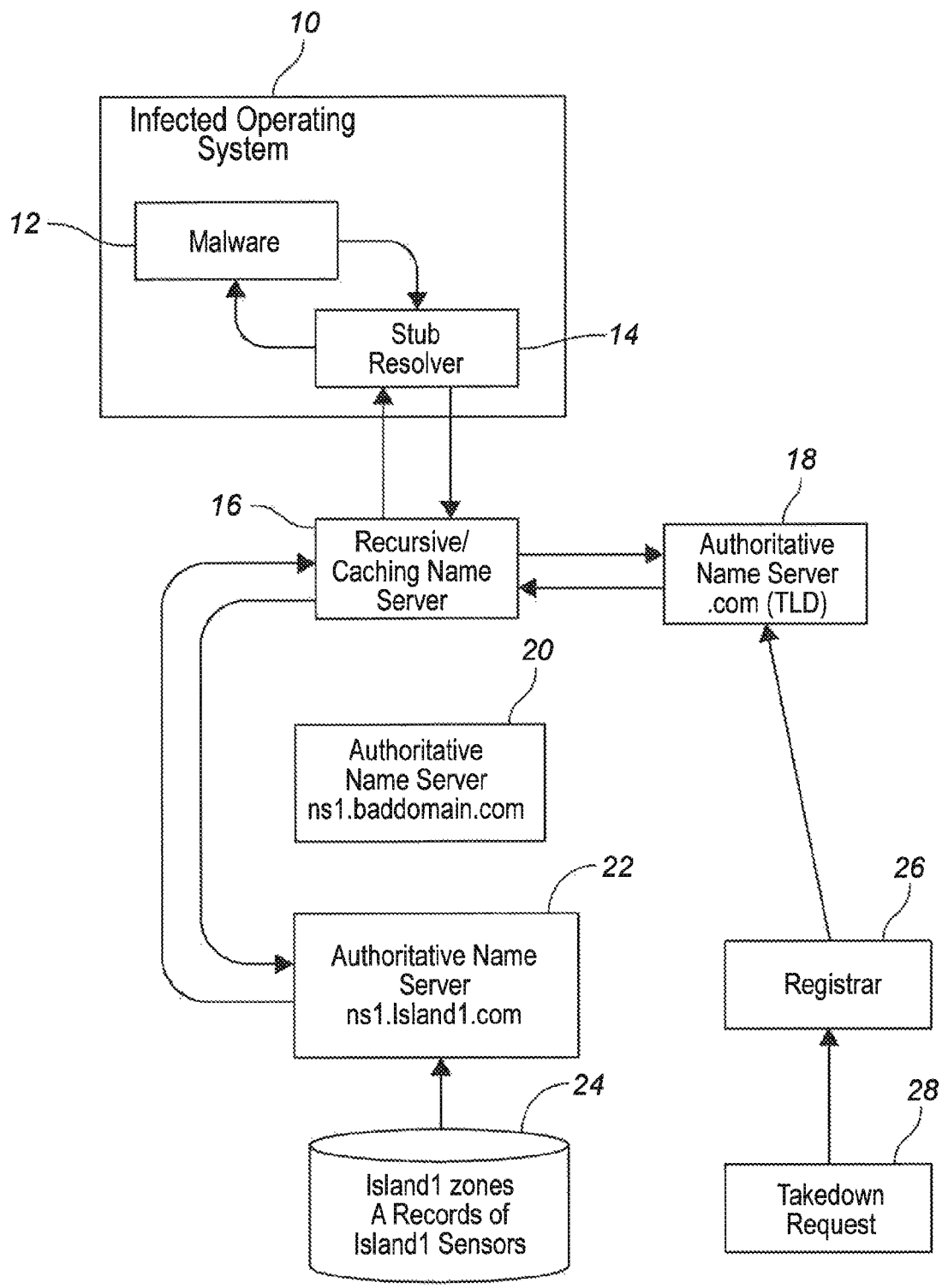
FIG. 2 is a diagram illustrating a process of malware when a domain has been deflected using the system of the present inventive concept.

Turning to FIG. 2, a process of malware when the domain, e.g., "baddomain.com" has been deflected using the DNS Registrar method of the present inventive concept is illustrated. The system of the present inventive concept is configured to transmit a takedown request 28 to a cooperative registrar 26, which has authority to make TLD zone file changes for the domain, e.g., "baddomain.com." The registrar 26 is operable to act upon a request and perform a zone update to the .com TLD zone at the server 18.

After the .com TLD zone at the server 18 has been updated by the system of the present inventive concept, the recursive server 16 is no longer able to receive the "glue" records from the TLD name server 18 corresponding to the original authoritative server 20 for the domain, e.g., "ns1.baddomain.com," as illustrated in FIG. 1. Rather, the .com TLD server 18 is now configured to return the "glue" records instructing the recursive server 16 to contact one of the name servers of the sinkhole islands 22.

The recursive server 16 is configured to query the island name server 22 for the domain, e.g., "baddomain.com." The recursive server 16 is configured to consult a database 24 to identify and obtain the "A" record or IP Address answer for a sinkhole sensor node within the island 22. The sensor IP address is then communicated to the malware 12 via the stub resolver 14.

In this manner, the present inventive concept provides a system and method operable to manage and/or distribute sinkholes.

The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method to resolve domain names through a managed sinkhole distribution, the method comprising:

initiating a top level domain (TLD)zone update at a first authoritative name server, the zone update includes one or more top level domain zone file changes for a target domain that redirects a query for an Internet Protocol (IP) address for the target domain to one or more authoritative name servers associated with a sinkhole island instead of directing the query to a second authoritative name server for the target domain that is different from the one or more authoritative name servers; and subsequent to the zone update, receiving the query for the IP address for the target domain by the one or more authoritative name servers associated with the sinkhole island that is one of a plurality of sinkhole islands associated with a sinkhole, each of the plurality of sinkhole islands being distributed and operating independently from another sinkhole island of the plurality of sinkhole islands and the query for the IP address for the target domain is in response to a request for the IP address from a source, wherein the one or more authoritative name servers associated with the sinkhole island is configured to access a database for the IP address for the target domain and return an IP address for a sinkhole sensor node within the sinkhole island to the source that initiated the request for IP address.

2. The method of claim 1, wherein the zone update is conducted by a cooperative registrar of the target domain that has authority to make the one or more top level domain zone file changes for the target domain in response to receiving a takedown request upon occurrence of an event.

3. The method of claim 1, wherein prior to receiving the query for the IP address for the target domain, the method further comprises receiving the request for the IP address by a recursive server.

4. The method of claim 3, wherein the source is a stub resolver.

5. The method of claim 3, wherein the zone update redirects the query for the IP address by preventing reception by the recursive server of glue records directed to the second authoritative name server and, in response to request for the IP address, providing glue records instructing the recursive server to issue the query for the IP address to the one or more authoritative name servers.

6. The method of claim 1, wherein each of the plurality of sinkhole islands is physically distributed from a neighboring sinkhole island of the plurality of sinkhole islands and includes an authoritative name server.

7. The method of claim 6, wherein the query for the IP address for the target domain is directed to an authoritative name server of the one or more authoritative name servers that is associated with the sinkhole island.

8. The method of claim 6, wherein each of the plurality of sinkhole islands is associated with a unique domain name system (DNS) name.

9. The method of claim 6, wherein each of the plurality of sinkhole islands further includes one or more sinkhole sensor nodes including the sinkhole sensor node.

10. The method of claim 1, wherein the IP address for the sinkhole sensor node is returned to a malware via a stub resolver.

11. The method of claim 1, wherein prior to initiating the zone update at the first authoritative name server, the method further comprising:
distributing components of the sinkhole to formulate the plurality of sinkhole islands.

12. The method of claim 11, further comprising:
setting the sinkhole sensor node to one or more IP addresses.

13. The method of claim 1, wherein the event is one or more of (i) an identification of a new malware author or group, (ii) an identification of a new malware family, or (iii) an elapse of a predetermined period of time.

14. The method of claim 1, wherein the event is one or more of (i) an occurrence of a public event, (ii) an identification of a new malware author or group, (iii) an identification of a new malware family, (iv) a component reaching a threshold, or (v) an elapse of a predetermined period of time.

15. The method of claim 1, wherein one or more sinkhole islands of the plurality of sinkhole islands being automatically created in response to a predetermined period of time has elapsed.

16. The method of claim 1, wherein the plurality of sinkhole islands enable one or more domains to be isolated to a particular sinkhole island of the plurality of sinkhole islands to prevent discovery of a remainder of the plurality of sinkhole islands associated with the sinkhole.

17. The method of claim 1, wherein the sinkhole island includes the one or more authoritative name servers and the sinkhole sensor node that operate to substitute the target domain with the IP address operating as a substitute domain for the target domain.

18. The method of claim 17, wherein a second sinkhole island of the plurality of sinkhole islands includes at least one authoritative name server and a sinkhole sensor node and the second sinkhole island being associated with a domain different than the target domain.

19. A system to provide a managed sinkhole distribution scheme, comprising:
one or more authoritative name servers associated with a sinkhole island of a plurality of sinkhole islands, the one or more authoritative name servers to receive a query generated in response to a request for an Internet Protocol (IP) address for the target domain subsequent to a top level domain (TLD) zone update that redirects the query to the one or more authoritative name servers instead of a first authoritative name server for the target domain that is different from the one or more authoritative name servers, each of the plurality of sinkhole islands being distributed and operating independently from another sinkhole island of the plurality of sinkhole islands; and
a database accessible by the one or more authoritative name servers associated with the sinkhole island, the database being accessed for the IP address for the target domain and, upon locating the IP address for the target domain, returns an IP address for a sinkhole sensor node within the sinkhole island to the one or more authoritative name servers for routing to a source that initiated the request for the IP address,
wherein each of the one or more authoritative name servers includes a processor and a memory.

20. The system of claim 19, wherein the query is further generated in response to a change in a top level domain zone file for the target domain performed by a cooperative registrar.

21. The system of claim 19 further comprising a recursive server configured to receive the request for the IP address prior to initiating the query for the IP address for the target domain to the one or more authoritative name servers.

22. The system of claim 19, wherein each of the plurality of sinkhole islands is physically distributed from a neighboring sinkhole island of the plurality of sinkhole islands and includes an authoritative name server.

23. The system of claim 22, wherein each of the plurality of sinkhole islands is associated with a unique domain name system (DNS) name.

24. The system of claim 23, wherein each of the plurality of sinkhole islands includes one or more sinkhole sensor nodes.

25. The system of claim 19, wherein one or more specific domains are isolated to the sinkhole island of the plurality of sinkhole islands to prevent discovery of a remainder of the plurality of sinkhole islands associated with the sinkhole.

26. The system of claim 19, wherein the sinkhole island includes the one or more authoritative name servers and the sinkhole sensor node that operate to substitute the target domain with the IP address operating as a substitute domain for the target domain.

27. The system of claim 26 further comprising a second sinkhole island of the plurality of sinkhole islands communicatively coupled to the database and associated with a domain that is different from the target domain, the second sinkhole includes at least one authoritative name server and a sinkhole sensor node.

* * * * *